(12) United States Patent
Aebischer

(10) Patent No.: US 9,219,427 B2
(45) Date of Patent: Dec. 22, 2015

(54) REDUCTION OF ELECTROSTATIC DISCHARGE EFFECTS IN CHARGE-PUMP ELEVATOR LADDER

(71) Applicant: Daniel Aebischer, Marin-Epagnier (CH)

(72) Inventor: Daniel Aebischer, Marin-Epagnier (CH)

(73) Assignee: SEMTECH CORPORATION, Camarillo, CA (US)

( * ) Notice: Subject to any disclaimer, the term of this patent is extended or adjusted under 35 U.S.C. 154(b) by 130 days.

(21) Appl. No.: 13/793,595

(22) Filed: Mar. 11, 2013

(65) Prior Publication Data

US 2014/0104903 A1 Apr. 17, 2014

Related U.S. Application Data

(60) Provisional application No. 61/712,683, filed on Oct. 11, 2012.

(51) Int. Cl.
| | |
|---|---|
| *H02H 9/00* | (2006.01) |
| *H02M 7/12* | (2006.01) |
| *H02M 1/32* | (2007.01) |
| *H02M 3/07* | (2006.01) |
| *H02H 9/04* | (2006.01) |

(52) U.S. Cl.
CPC ............. *H02M 7/125* (2013.01); *H02H 9/046* (2013.01); *H02M 1/32* (2013.01); *H02M 3/073* (2013.01); *H02M 2003/075* (2013.01)

(58) Field of Classification Search
CPC .................................................. H01L 27/0266
USPC .......................................................... 361/56
See application file for complete search history.

(56) References Cited

U.S. PATENT DOCUMENTS

| | | | | |
|---|---|---|---|---|
| 6,570,435 | B1 * | 5/2003 | Hastings | ........................ 327/536 |
| 7,764,526 | B1 | 7/2010 | Xing et al. | |
| 8,030,988 | B2 * | 10/2011 | Yap et al. | ........................ 327/536 |
| 2012/0049936 | A1 | 3/2012 | Adkins et al. | |

FOREIGN PATENT DOCUMENTS

JP 2005033865 A 2/2005

OTHER PUBLICATIONS

European Search Report dated Mar. 19, 2015 for European Application No. 13186824.2, 7 pages.
Pelliconi, et al., "Power Efficient Charge Pump in Deep Submicron Standard CMOS Technology," Solid State Circuits Conference, Sep. 2001, pp. 73-76.

* cited by examiner

*Primary Examiner* — Stephen W Jackson
(74) *Attorney, Agent, or Firm* — Amin, Turocy & Watson, LLP

(57) ABSTRACT

The final cell or cells in a cascade or ladder of voltage elevator cells may be exposed to significant overvoltages from electrostatic discharge originating in off-chip loads. In such conditions, the final cell or cells may be damaged or destroyed by such overvoltages. Protective circuitry may be added to one or more of the final voltage elevator cells to reduce or eliminate such damage or destruction by distributing the overvoltage among two or more cells. Such protective circuitry may include a capacitor coupled in parallel with the input and output node of one or more of the final voltage elevator cells. The protective circuitry may also include a resistor coupled in series between the final voltage elevator cell and the load.

19 Claims, 5 Drawing Sheets

REDUCTION OF ELECTROSTATIC DISCHARGE EFFECTS IN CHARGE-PUMP ELEVATOR LADDER

CROSS-REFERENCE TO RELATED APPLICATION

This application claims the benefit of U.S. Provisional Application No. 61/712,683, filed Oct. 11, 2012.

FIELD OF INVENTION

This invention relates to microelectronics and semiconductor circuitry. More specifically, the invention relates to charge pump voltage multipliers. Even more specifically, the invention relates to the reduction of negative effects of fast load changes or off-chip electrostatic discharge in such multipliers.

BACKGROUND OF THE INVENTION

Cross-coupled MOS inverter cells, driven by capacitively-coupled complementary clock signals are efficient building blocks in charge-pumps. These cells may be used to elevate an input DC voltage to a higher voltage output level. The cells may also be used to reduce an input DC voltage to a lower voltage output level. A positive input DC voltage may optionally be reduced to an output level below zero volts.

Known applications of these cells are proposed in P. Favrat, P. Deval, M. J. Declercq, "A High-Efficiency CMOS Voltage Doubler," IEEE Journal of Solid-State Circuits, Vol. 33, No. 3, March 1998, and R. Pelliconi et al., "Power Efficient Charge Pump in Deep Submicron Standard CMOS Technology," Proc. 27 ESSCIRC, 2001. As illustrated in FIG. 1, which is an alternative illustration of Pelliconi's FIG. 1 or portions of FIG. 2 of J. Cha, "Analysis and Design Techniques of CMOS Charge-Pump-Based Radio-Frequency Antenna-Switch Controllers, IEEE Trans. On Circuits and Systems—I: Regular Papers, Vol. 56, No. 5, May 2009, these disclosures describe a dual-bucket cell that may act as a voltage doubler.

As illustrated in FIG. 1, herein, an input voltage Vlow is input to two MOSFET inverters. The first inverter comprises NMOS transistor M1 and PMOS transistor M3, while the second inverter comprises NMOS transistor M2 and PMOS transistor M4. Both inverters' outputs are coupled to output voltage Vhigh. A clock signal clk is coupled via capacitor C1 to the gates of M1 and M3, and the drains of M2 and M4. Circuitry for generating a clock signal is not illustrated herein, but many circuits for generating clock signals are well-known to those of ordinary skill in the art. The inverse of clock signal clk is represented as inverted clock signal nclk, which is low when clk is high and vice-versa. Circuitry for generating signal nclk is not illustrated, but is well-known in the art. The inverted clock signal nclk is coupled via capacitor C2 to the gates of M2 and M4 and the drains of M1 and M3. One of ordinary skill in the art will recognize the manner in which the circuitry illustrated in FIG. 1 may output a higher voltage at node Vhigh than is input at node Vlow.

A dual-bucket cell, for example of the type illustrated in FIG. 1, may be cascaded into multiple stages to obtain an output voltage that is a higher multiple of the input voltage by electrically connecting the output Vhigh of one cell to the input Vlow of a second cell. This may be repeated any number of times provided that the circuitry is capable of handling the input and output voltage levels. An exemplary arrangement of this type is described in R. Pelliconi et al., "Power Efficient Charge Pump in Deep Submicron Standard CMOS Technology," Proc. 27 ESSCIRC, 2001.

FIG. 2 sets forth an example of cascaded dual-bucket cells that may be used for voltage elevation. As illustrated in FIG. 2, each of cells 205, 207, 210 and any number of intermediate cells represented by ellipses ( . . . ) may be cascaded. Each of cells 205, 207, 210, and any intermediate cells may be configured in the manner of the circuitry illustrated in FIG. 1. Input voltage V_LOW_IN is input into node 212, which corresponds to Vlow. Cell 205 receives the input at node 212 and outputs a higher voltage at node 206, which corresponds to Vhigh. Node 206 is coupled to the input Vlow of cell 207. Cell 207 receives the input at node 206 and outputs a higher voltage at node 208, which corresponds to Vhigh. Node 208 may be coupled to node 209 or, alternatively, to the input of an intermediate cell. Node 209 is coupled to the output voltage of the preceding cell and corresponds to Vlow for cell 210. Cell 210 receives the input at node 209 and outputs a higher voltage at node 211, which corresponds to Vhigh. Alternatively, as set forth above, any or all of the cells in the cascade may be configured to output a voltage that is lower than the input voltage. Thus, the labels V_LOW_IN and V_HIGH_OUT are representative of a typical use, but V_LOW_IN may actually be a higher voltage than V_HIGH_OUT.

A clock input signal CLK_IN is preferably provided to amplifiers 201, 202. Amplifier 201 outputs amplified clock signal clk to each of cells 205, 207, 210, and any intermediate nodes ( . . . ) via capacitors 203. Amplifier 202 outputs inverted clock signal nclk to each of cells 205, 207, 210, and any intermediate nodes ( . . . ) via capacitors 204. Capacitors 203 and 204 are not illustrated herein for intermediate nodes ( . . . ), but, if used, will be connected in the same fashion as those illustrated with respect to cells 205, 207, 210. That is, capacitor 203 for any intermediate nodes ( . . . ) will be connected between signal clk and the node. And capacitor 204 for any intermediate nodes ( . . . ) will be connected between signal nclk and the node.

Node 211 provides output voltage V_HIGH_OUT from cell 210. Node 211 is preferably coupled to ground via capacitor 213.

Cascaded cells of the type illustrated in FIG. 2 may be used to provide a much higher multiple of the input voltage than single cells of the type illustrated in FIG. 1. The cascaded circuit of FIG. 2 eliminates at least one of the drawbacks of a Dickson charge pump, in that it does not result in voltage drops across the diodes that are present in Dickson charge pumps.

In the preferred normal operation of the device of FIG. 2, the voltages at the various nodes 212, 206, 208, 209, 211 along the ladder are relatively regularly distributed between the voltage at V_LOW_IN and the voltage at V_HIGH_OUT. In addition, some small capacitors and relatively large resistance across each of the cells (for example, 205, 207, 210) may reduce ripple and irregular effects of leakage. Because of this, the local voltage difference across each cell 205, 207, 210 will not exceed the relatively low power supply of the clock drivers. If the well in which the devices are constructed is designed to withstand relatively high DC voltage, the local MOS transistors within each cell may be constructed with a gate made of a thin oxide layer. This thin oxide gate construction generally allows for more compact component size and higher efficiency for any given on-resistance of a component. As taught by M. D. Ker, S. L. Chen, C. S. Tsai, "Design of Charge Pump Circuit With Consideration of Gate-Oxide Reliability in Low-Voltage CMOS processes," IEEE Journal of Solid-State Circuits, Vol. 41, No. 5, May 2006, this type of thin oxide gate structure is not expected to suffer gate-oxide reliability problems.

However, if node V_HIGH_OUT is connected to off-chip circuitry with an external final decoupling capacitor, it is desirable to make the structure insensitive to electrostatic discharge ("ESD"). Because the node V_HIGH_OUT is preferably a high voltage node, it is desirable to use ESD protection devices within the pad. Neither these devices nor the pad is illustrated herein, because such structures will be familiar to one of ordinary skill in the art. Yet, even with such structures, the on-chip voltage at node V_HIGH_OUT may be subjected to sharp and relatively high voltage transients. These transients may be much higher than the transients encountered in normal chip operating conditions in a chip having thin oxide devices. In such transients, the final cell 210 of the charge pump is exposed to the voltage transients and may be damaged or destroyed by the transient.

It would be desirable to reduce the amount of damage or destruction to the cells of the charge pump due to sharp and/or high voltage transients from off-chip sources.

It would also be desirable to reduce the amount of damage or destruction to other types of cells sensitive to overvoltage across cells. Accordingly, the invention described herein is not limited to applicability to cross-coupled MOS inverter cells.

SUMMARY OF THE INVENTION

The present invention reduces or eliminates the identified problems by providing novel circuitry and modes of operation for use with cascaded voltage elevation cells. The present invention reduces or eliminates these problems by providing an embodiment for coupling a capacitor to nodes vlow and vhigh in parallel with one or more cells within the cascaded structure.

In another embodiment, capacitors may be coupled in parallel across more than one cell within the cascaded structure.

In yet another embodiment, a resistor may be coupled in series between the final cell and the output load.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 3:
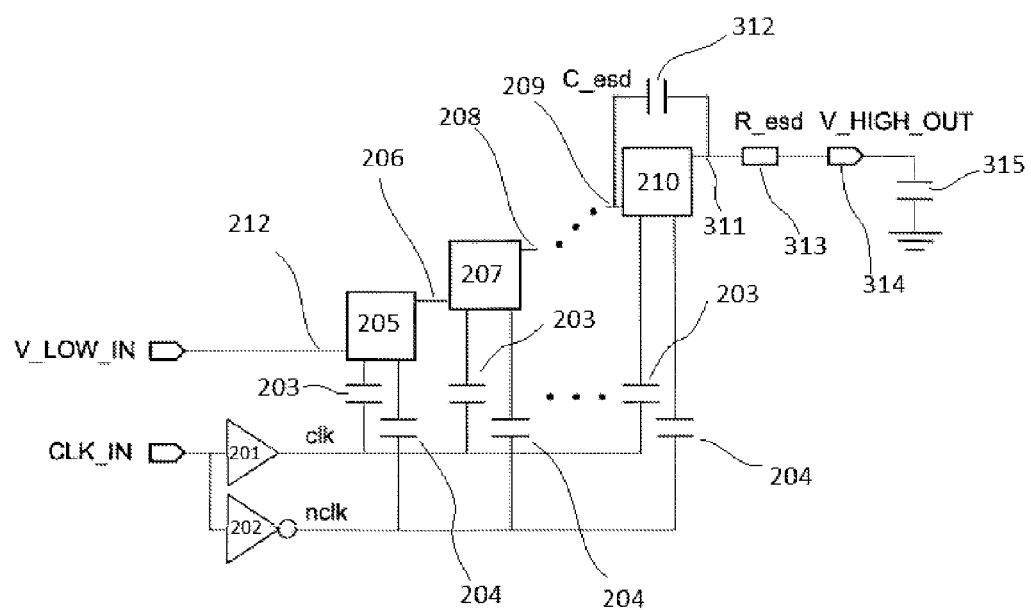
FIG. 3 illustrates exemplary circuitry according to the present invention.

FIG. 3 illustrates an exemplary embodiment of the present invention, including a capacitor 312 with capacitance C_esd coupled between nodes 209 and 311 to a voltage multiplier cell 210. A resistor 313 with resistance R_esd may be electrically coupled between node 311 and node V_HIGH_OUT 314. Finally, a capacitor 315 may be electrically coupled between node 314 and ground to reduce the effects of electrostatic discharge. When such a capacitor is absent or is insufficiently large, the effect of electrostatic discharge may be much more problematic.

If the small capacitors (mentioned above) that are coupled across each cell were large, these capacitors would allow for better distribution of transient overvoltages across several cells, thereby reducing the potential for damage to or destruction of each individual cell, including the final cell 210. When ESD is encountered, however, the clock capacitors 203, 204 act as if they were capacitors to ground. The clock capacitors 203, 204 also attenuate the overvoltage on the innermost cells (e.g., those cells between node 209 and node 206) but leave the final cell 210 exposed to the ESD. Capacitors 203, 204 may, for example, be implemented as 6 pF thick oxide capacitors in a charge pump delivering 30 V with a 50 µA to 100 µA load current. For these reasons, the clock capacitors are generally incapable of solving the problem that the present invention seeks to resolve. Additionally, increasing the clock capacitors 203, 204 to a capacitance sufficient to solve the ESD problem would significantly increase the size of the capacitors 203, 204 and undesirably increase the area needed to form these capacitors on the chip.

Thus, it is desirable to form capacitors (e.g., capacitor 312) that are sufficiently large to reduce the impact of the overvoltage resulting from ESD and thereby protect the final few or final several cells. Two examples of possible configurations of such capacitors are set forth in FIGS. 5 and 6. A preferred embodiment in FIG. 5 includes capacitor 312 electrically coupled in parallel with cell 210 at nodes 311 and 522. Capacitor 519 is preferably electrically coupled in parallel with cell 517 at nodes 521 and 522. And capacitor 518 is preferably electrically coupled in parallel with cell 516 at nodes 520 and 521. Because the final cell 210 will typically encounter the largest voltage from ESD, it is preferable to form capacitor 312 with a larger capacitance than the other capacitors. For example, in an implementation of a charge pump voltage multiplier that is configured to deliver 30 volts with a 50 µA to 100 µA load current, capacitor 312 may be a 10 pF to 15 pF capacitor while capacitors 518 and 519 may each be formed as 5 pF or smaller capacitors. One of ordinary skill in the art will recognize that charge pump voltage multipliers of much different (i.e., greater or lesser) capacity may be implemented using the invention disclosed herein. For example, in a device targeting a 5 µA load current, the capacitors may have much smaller capacitance and in a device with greater capacity, having larger MOS devices, the capacitance would be increased as needed to provide the benefits of the invention. It is recognized that at some point in scaling the device to a larger capacity, the size of the device upon a chip would become substantially large and may reach some limits of feasibility based upon the amount of chip area needed for implementation of the capacitors and other semiconductor devices. While only three cells 516, 517, 210 are illustrated in FIGS. 5 and 6, one of ordinary skill in the art will recognize that the configurations illustrated in these FIGS. may be extended to additional cells.

Figure 5:
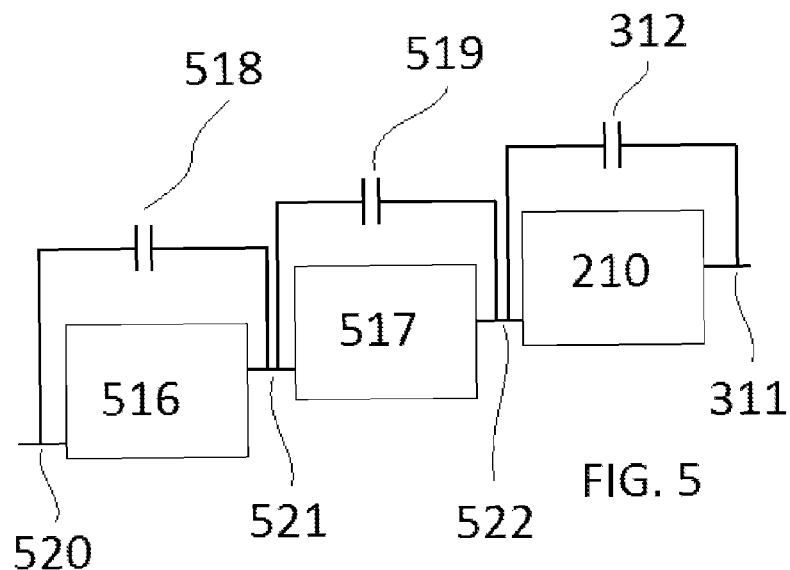
FIG. 5 illustrates exemplary circuitry according to the present invention.

As illustrated in FIG. 5, in a preferred embodiment, cell 210 is the final cell and node 311 is electrically coupled to V_HIGH_OUT, preferably either via a resistor 313 or directly. The vhigh node of cell 210 is coupled to node 311 and the vlow node of cell 210 is coupled to node 522. Cell 517 directly precedes cell 210. The vhigh node of cell 517 is coupled to node 522 and the vlow node of cell 210 is coupled to node 521. Cell 516 directly precedes cell 517. The vhigh node of cell 516 is coupled to node 521 and the vlow node of cell 516 is coupled to node 520. With respect to the embodiment set forth in FIG. 3, node 520 may correspond to node 212, node 206, node 208, or any intermediate node (represented by " . . . ") that is removed from node 311 by at least three voltage multiplier cells.

Figure 6:
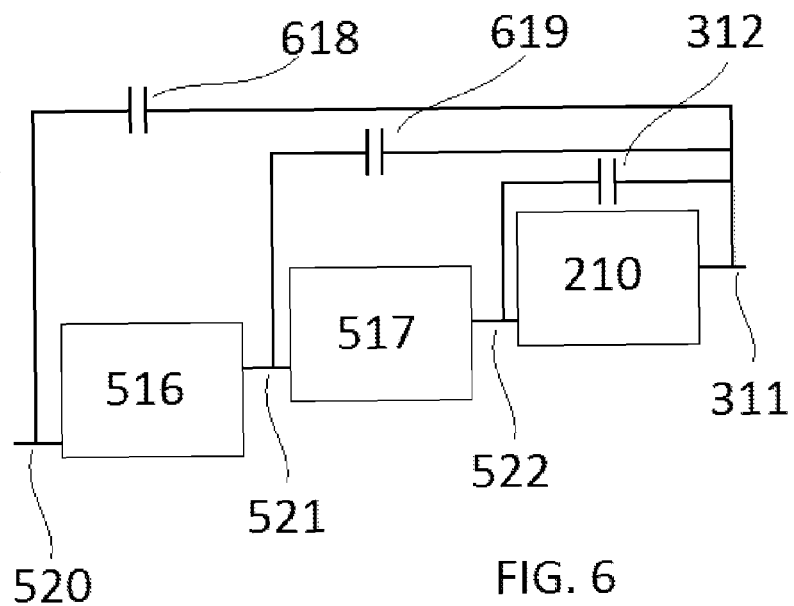
FIG. 6 illustrates exemplary circuitry according to the present invention.

Another embodiment, as illustrated in FIG. 6, may replace the functionality of capacitors 518 and 519 with differently configured capacitors 618 and 619. Capacitor 619 is configured to span the final two cells 517 and 210 and is coupled in parallel to these cells at nodes 521 and 311. Capacitor 618 is configured to span the final three cells 516, 517, and 210 and is coupled in parallel to these cells at nodes 520 and 311.

The configurations set forth in FIGS. 5 and 6 are interchangeable in various fashions. For example, capacitors 312 and 519 may be combined with capacitor 618 rather than 518. In another exemplary configuration, capacitors 312 and 518 may be combined with capacitor 619 rather than 519. Alternatively, either of capacitors 518 or 618 may be eliminated. It would also be possible to use, for example, capacitors 618 and 518 together or capacitors 619 and 519 together to achieve the effects of this invention. These various configurations will distribute the overvoltage in different manners that may be desirable based upon differing configurations of the various cells in the cascade.

Distributing the overvoltage resulting from ESD over the final two cells 517, 210 or final three cells 516, 517, 210 is often sufficient to reduce or eliminate the damage or destruction that would otherwise result if the final cell 210 bore the full overvoltage. The present invention also contemplates that it is possible to distribute the overvoltage over a larger number of cells by spanning these additional cells with capacitors. However, such distribution may not be necessary and may result in unnecessary waste of chip area in the formation of additional capacitors. One of ordinary skill in the art will recognize that capacitors 312, 518, 519, 618, 619 may be implemented in many fashions, including metal-metal, MOS, etc.

In addition to the addition of capacitors (e.g., capacitors 312, 519, 518, 618, 619), it is also desirable to add a resistor 313 in series between node 311 and V_HIGH_OUT node 314. This resistor 313 will participate in the attenuation of ESD pulses along with the capacitors. If used, the additional resistance of resistor 313 will slightly degrade the normal performance of the voltage elevator. But resistor 313 can be configured such that this performance degradation is within an acceptable range, because the output impedance of the described voltage elevator is relatively high. One of ordinary skill will recognize that various configurations of resistor 313 may be optimal depending on the goals of the designer, the configuration of the other components, and the designer's preferences with respect to the acceptable performance degradation versus the desirable level of protection against ESD pulses.

Figure 4:
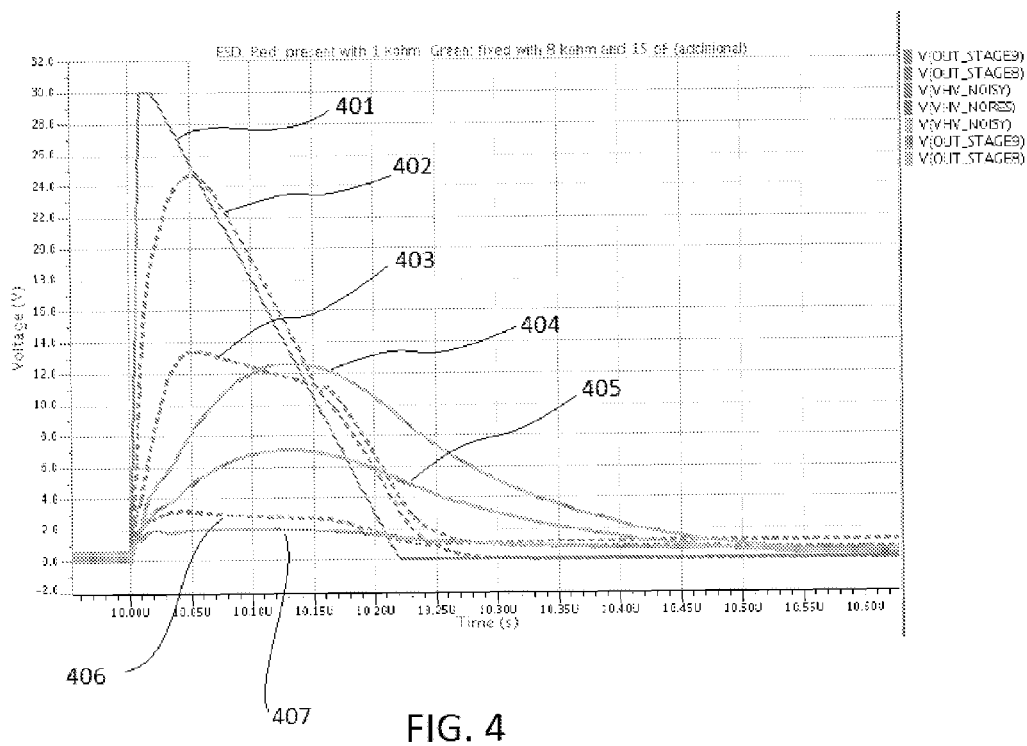
FIG. 4 illustrates the potential improvement in voltage curves that may be seen through use of the present invention.

FIG. 4 is an exemplary illustration of potential beneficial effects of the present invention. One of ordinary skill in the art will recognize that with different fabrication processes or device configurations, even the use of circuit elements with similar electrical properties will likely result in at least some variance, possibly a large variance, from the values illustrated herein. Thus, it may not be possible to exactly replicate the values set forth herein in an experiment. Curve 401 illustrates an exemplary expected ESD pulse at node V_HIGH_OUT. As illustrated, the pulse of curve 401 peaks at approximately 30 volts. Curve 402 illustrates the absolute voltage at node 311 without the capacitor 312 of the present invention. As illustrated, curve 402 peaks at over 24 volts shortly after the peak of curve 401 was reached. Curve 403 illustrates the absolute voltage at node 522 without the capacitor 519 or 619 of the present invention. As illustrated, curve 403 peaks at approximately 13 volts. Curve 406 illustrates the absolute voltage at node 521 without the capacitor 518 or 618 of the present invention. As illustrated, curve 406 peaks between 2 and 4 volts. The corresponding cells 210 and 517 are subjected to the difference in voltage between the respective input and output nodes of the cells as illustrated by the curves. Curve 404 illustrates the absolute voltage at node 311 with the addition of the capacitor 312 of the present invention. As illustrated, curve 404 peaks at less than 14 volts. Curve 405 illustrates the absolute voltage at node 522 with the addition of the capacitor 519 of the present invention. As illustrated, curve 405 peaks at less than 8 volts. And curve 407 illustrates the absolute voltage at node 521 with the addition of the capacitor 518 of the present invention. As illustrated, curve 407 peaks at approximately 2 volts. The exemplary benefits illustrated in FIG. 4 assume an output resistance of 1 kOhm with respect to curves 402, 403, and 406. An output resistance of 8 kOhm and protective capacitance of 15 pF is assumed with respect to curves 404, 405, and 407. (As indicated above with respect to the capacitors used in implementing the disclosed invention, one of ordinary skill will recognize that a larger resistance may be needed for a lighter charge pump and a small resistance for a heavy load.) As can be seen, the peak voltage at node 311 drops from over 24V in curve 402 to less than 14V in curve 404 with the additional resistor and capacitor in the presence of the 30V ESD pulse illustrated in curve 401. Similarly, the peak voltage at node 522 drops from over 12V in curve 403 to less than 8V in curve 405 under the same conditions. Such significant reductions in overvoltage on the final cells will greatly reduce the damage or destruction that may otherwise be caused by ESD pulses.

Figure 1:
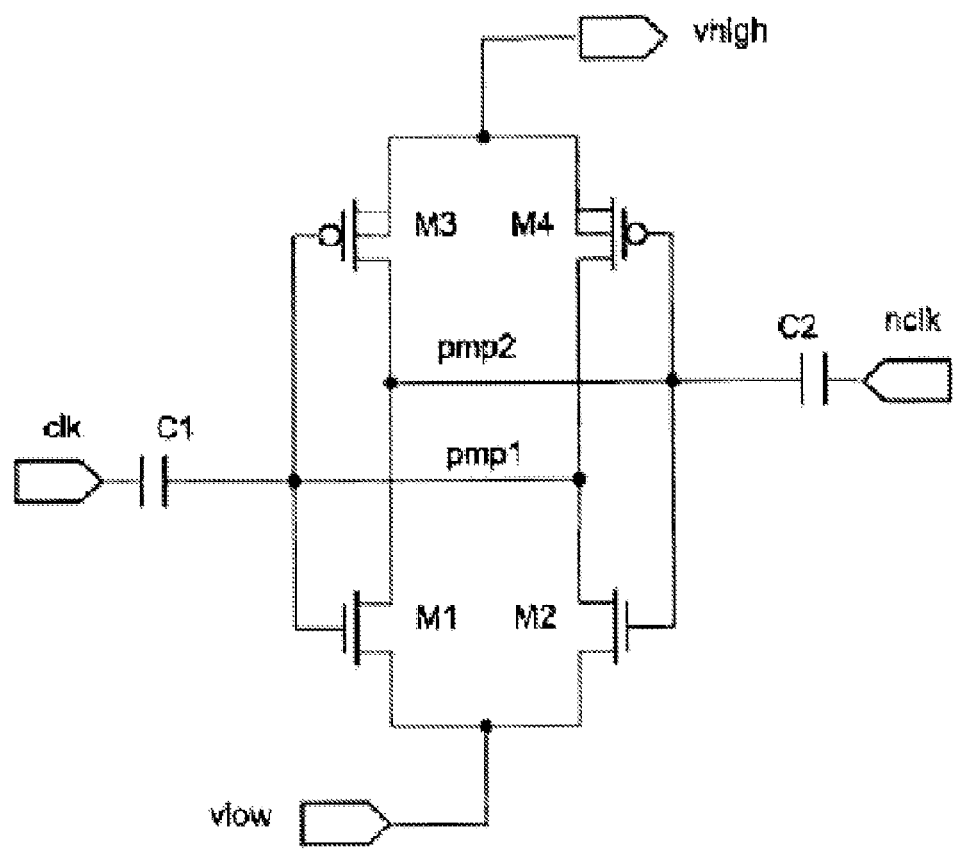
FIG. 1 illustrates prior art circuitry for a dual-bucket cell voltage elevator.
Figure 2:
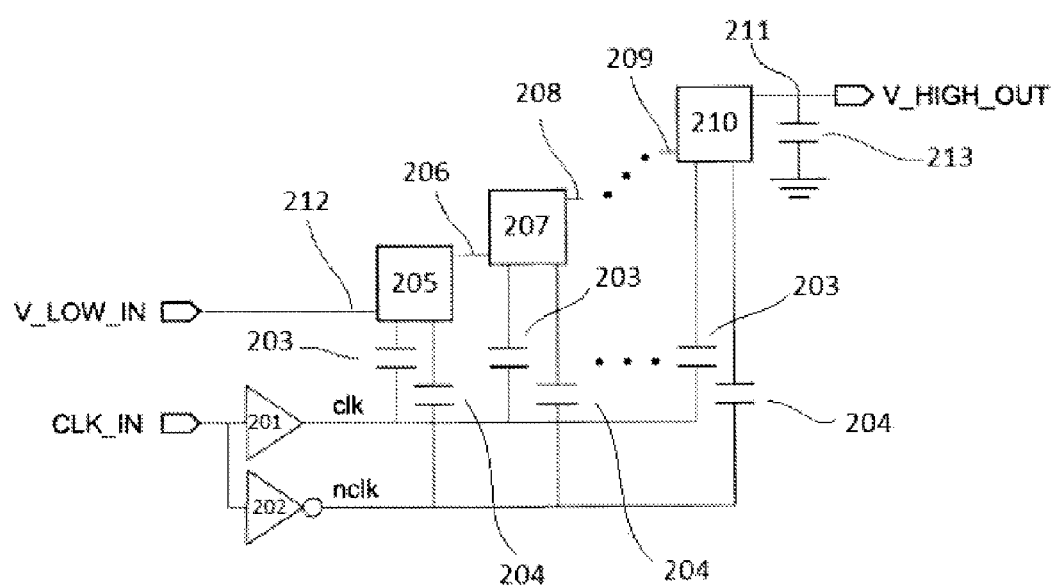
FIG. 2 illustrates prior art circuitry for cascaded dual-bucket cells for voltage elevation.

One of ordinary skill will recognize that the ESD protection circuitry illustrated in FIGS. 3, 5, and 6 and further discussed above may be implemented with respect to one, two, three, or any number of cells within a cascaded circuit such as that illustrated in FIG. 2. One of ordinary skill in the art will also recognize that the protection circuitry of the present invention may also be used to protect the cells against fast variations of the output load or output voltage that occur in circumstances other than through ESD.

What is claimed is:

1. A voltage multiplier cell, comprising:
   an input node configured to receive an input voltage and electrically coupled to a voltage multiplier circuit within the cell;
   an output node electrically coupled to the voltage multiplier circuit and configured to output an output voltage;
   a capacitor electrically coupled to the input node and the output node in parallel with the voltage multiplier circuit and configured to distribute to the input node a portion of an electrostatic pulse received at the output node; and
   a resistor electrically coupled to the output node in series between the output node and an output of the cell configured for connection to a load.

2. The voltage multiplier cell of claim 1, wherein the capacitor has a capacitance between 10 pF and 20 pF.

3. The voltage multiplier cell of claim 2, wherein the resistance of the resistor is between 5 kOhm and 10 kOhm.

4. The voltage multiplier cell of claim 1, wherein the capacitor is formed using metal-metal or metal-oxide-semiconductor (MOS) fabrication.

5. A voltage multiplier, comprising:
a plurality of voltage multiplier cells, each comprising
at least two cross-coupled metal-oxide-semiconductor (MOS) inverters,
an input node electrically coupled to a first plurality of the at least two cross-coupled MOS inverters and configured to receive an input voltage,
an output node electrically coupled to the plurality of the at least two cross-coupled MOS inverters and configured to output an output voltage, and
a capacitor electrically coupled to the input node and the output node in parallel with the plurality of the at least two cross-coupled MOS inverters and configured to distribute to the input node a portion of an electrostatic pulse received at the output node; and
wherein a first voltage multiplier cell and a second voltage multiplier cell of the plurality of voltage multiplier cells are electrically coupled in series, the output node of the first voltage multiplier is electrically coupled to the input node of the second voltage multiplier cell.

6. The voltage multiplier of claim 5, wherein the plurality of voltage multiplier cells comprises at least three voltage multiplier cells.

7. The voltage multiplier of claim 5, further comprising
a resistor configured to connect to a load and electrically coupled to an output node of a voltage multiplier cell of the plurality of voltage multiplier cells, wherein the resistor is configured in series between the output node of the voltage multiplier and an output of the voltage multiplier cell.

8. The voltage multiplier of claim 5, wherein the capacitor has a capacitance between 10 pF and 20 pF.

9. The voltage multiplier of claim 7, wherein the resistance of the resistor is between 5 kOhm and 10 kOhm.

10. The voltage multiplier of claim 5, wherein the capacitor is formed using metal-metal or MOS fabrication.

11. A method, comprising:
distributing, by means of a plurality of capacitors, a transient overvoltage across a plurality of voltage multiplier cells, wherein the transient overvoltage is greater than a transient voltage present in normal operation of a device.

12. The method of claim 11, wherein the distributing comprises
distributing the transient overvoltage to prevent damage to each of the plurality of voltage multiplier cells.

13. The method of claim 12, wherein
the transient overvoltage is distributed by at least one capacitor coupled in parallel with each of the plurality of voltage multiplier cells.

14. The method of claim 13, wherein
each of the at least one capacitor is coupled to a respective input of a voltage multiplier cell with which the capacitor is coupled in parallel, and
each of the at least one capacitor is coupled to a respective output of the voltage multiplier cell, and wherein a voltage difference between the respective output of the voltage multiplier cell and the output of the plurality of cells is less than a second voltage difference between the respective output of the voltage multiplier cell and the input to which a capacitor is coupled.

15. The method of claim 11, wherein the distributing comprises
distributing the transient overvoltage across at least three capacitors.

16. The method of claim 15, wherein
the at least three capacitors are electrically mutually coupled in series, and
each of the at least three capacitors is coupled in parallel with a single voltage multiplier cell of the plurality of voltage multiplier cells.

17. The method of claim 15, wherein
each of the at least three capacitors is electrically coupled at a first end to a single point,
each of the at least three capacitors is coupled at a second end to a a second single point, and wherein a first capacitor of the at least three capacitors is coupled in parallel with a single voltage multiplier cell of the plurality of voltage multiplier cells, a second capacitor of the at least three capacitors is coupled in parallel with two voltage multiplier cells of the plurality of voltage multiplier cells, and a third capacitor of the at least three capacitors is coupled in parallel with three voltage multiplier cells of the plurality of voltage multiplier cells.

18. The method of claim 11, further comprising
attenuating the transient overvoltage by means of a resistor connected to an output of the plurality of voltage multiplier cells.

19. The method of claim 18, wherein the resistance of the resistor is between 5kOhm and 10 kOhm.

* * * * *